No. 870,302. PATENTED NOV. 5, 1907.
W. F. MacGREGOR.
SIEVE FOR THRESHING MACHINES.
APPLICATION FILED JULY 17, 1905.
3 SHEETS—SHEET 1.
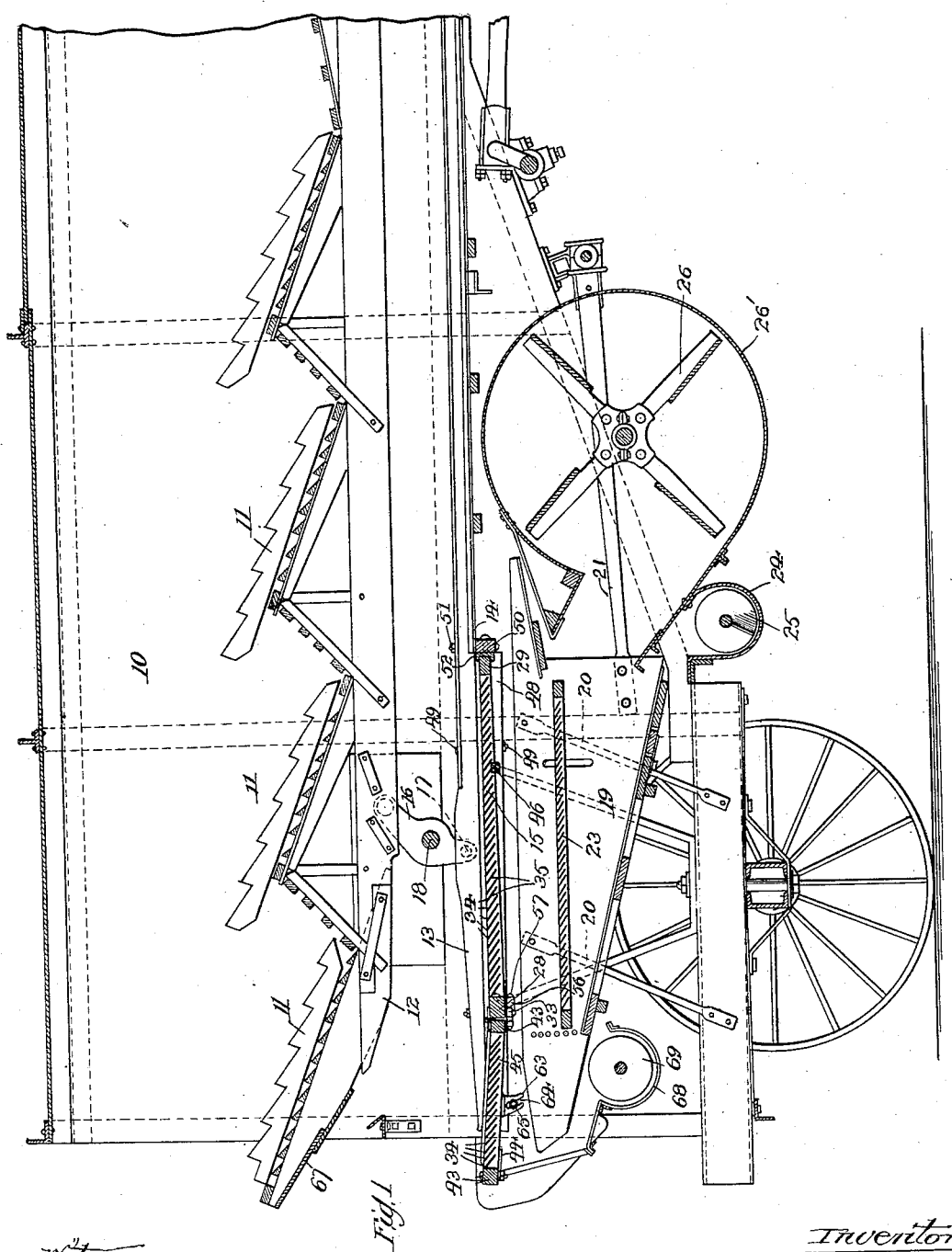

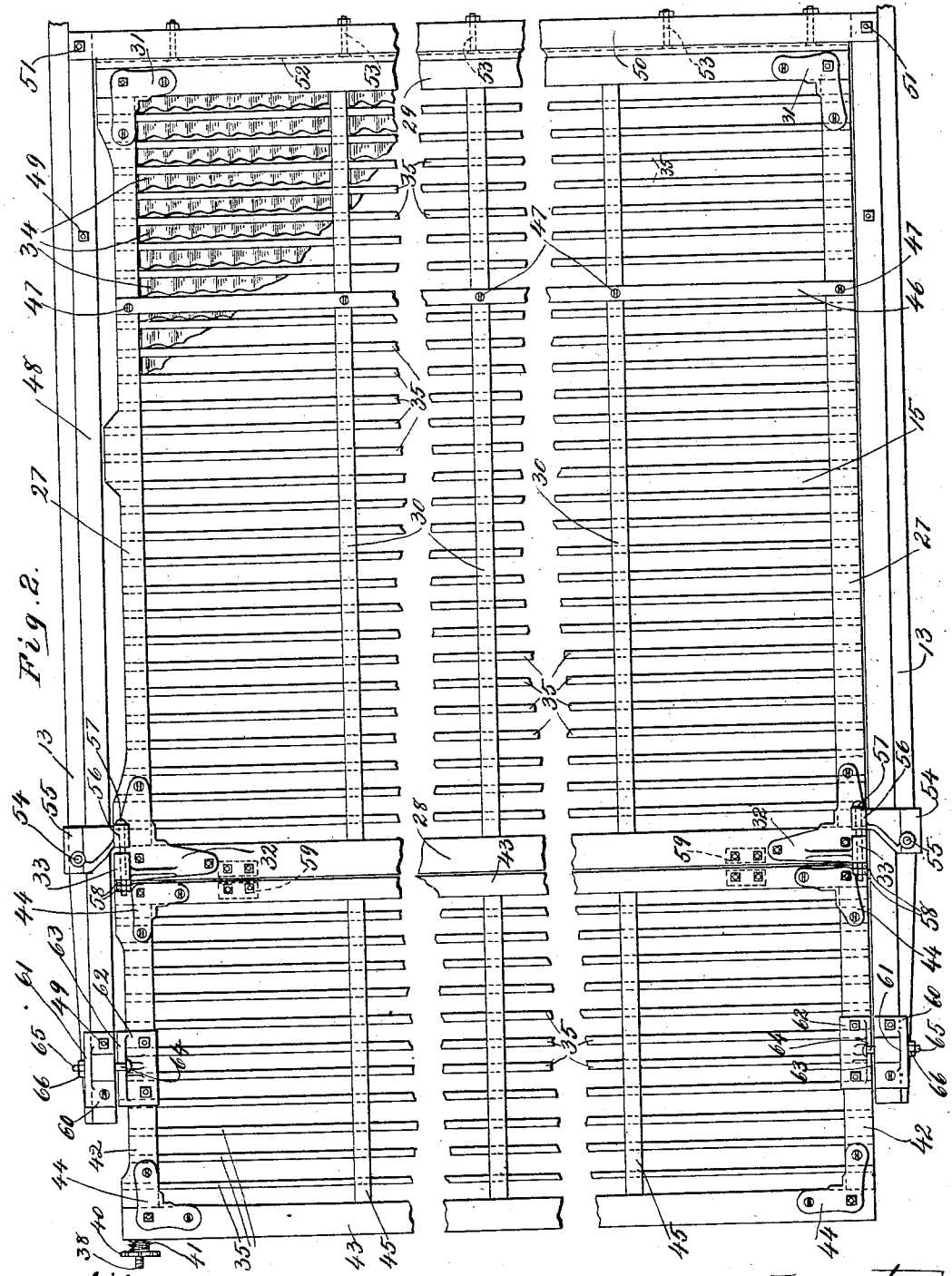

No. 870,302. PATENTED NOV. 5, 1907.
W. F. MacGREGOR.
SIEVE FOR THRESHING MACHINES.
APPLICATION FILED JULY 17, 1905.
3 SHEETS—SHEET 3.
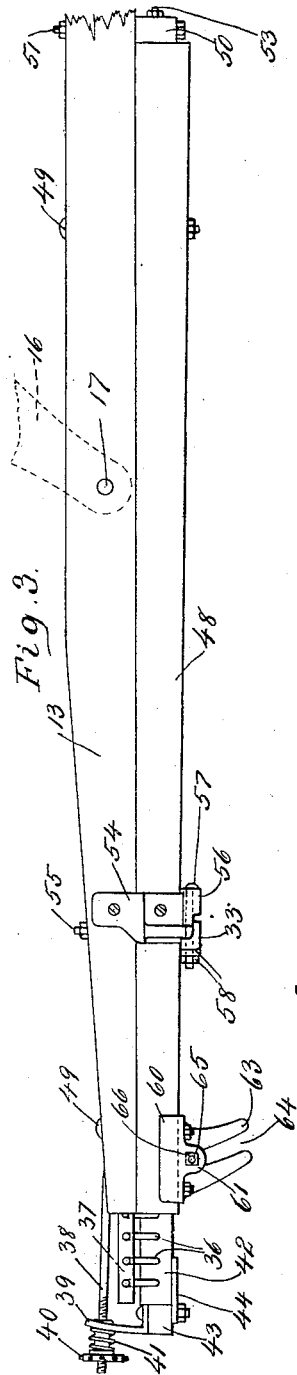
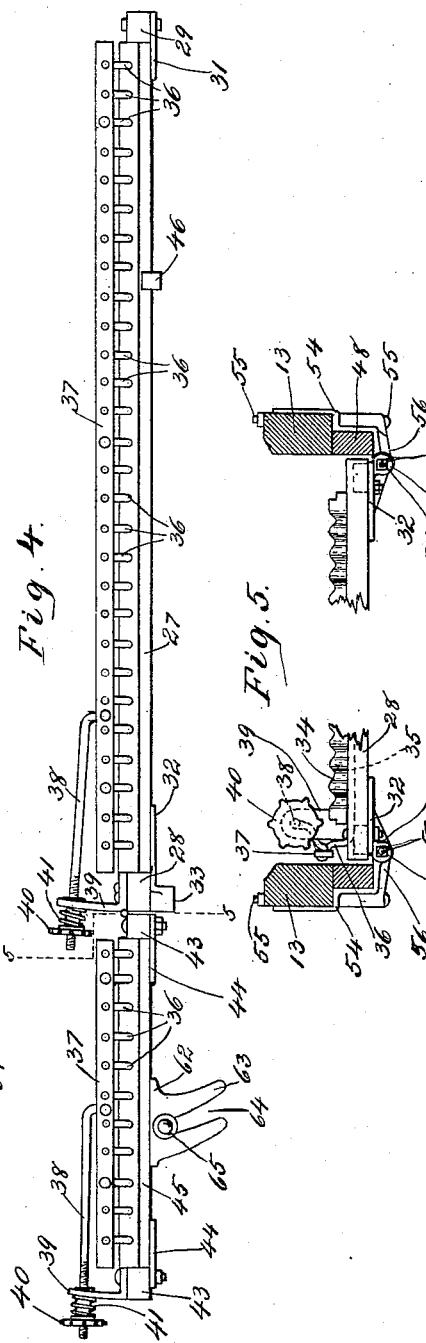
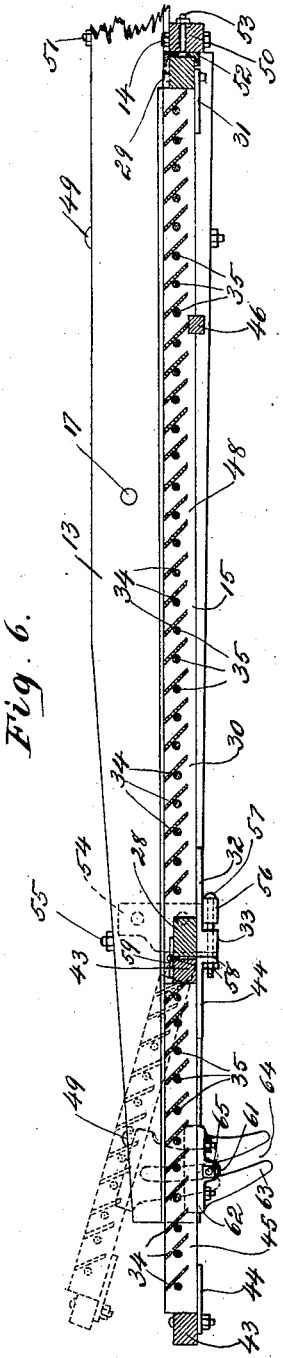
Witnesses:
Inventor:
Wallace F. MacGregor
by Price Fisher
Attys

UNITED STATES PATENT OFFICE.

WALLACE F. MacGREGOR, OF RACINE, WISCONSIN.

SIEVE FOR THRESHING-MACHINES.

No. 870,302.　　　　Specification of Letters Patent.　　　Patented Nov. 5, 1907.

Application filed July 17, 1905. Serial No. 270,012.

*To all whom it may concern:*

Be it known that I, WALLACE F. MACGREGOR, a citizen of the United States, and a resident of Racine, county of Racine, and State of Wisconsin, have invented certain new and useful Improvements in Sieves for Threshing-Machines, of which the following is declared to be a full, clear, and exact description.

The improvement relates to sieves for threshing machines and more particularly to the manner of mounting the same and to the arrangement of the adjustable sieve section at its rear end.

The invention seeks to provide a construction by which the sieve may be rigidly but removably mounted between its reciprocating side supports, which will obviate the necessity of employing cross rods between the supports for holding the sieve in position.

Further objects of the invention are to provide an improved arrangement of adjustable extension at the rear end of the sieve.

The invention consists in the features of construction, combinations and arrangements of parts hereinafter set forth, illustrated in the accompanying drawings and more particularly pointed out in the appended claims.

In the drawings Figure 1 is a sectional view of the rear portion of the threshing machine with the present improved sieve arrangement applied thereto. Fig 2 is an inverted plan view of the sieve and supports therefor. Fig. 3 is a side elevation of parts shown in Fig. 2. Fig. 4 is a similar view of the sieve removed from position. Fig. 5 is a detail section on line 5—5 of Fig. 4. Fig. 6 is a longitudinal section of the parts shown in Fig. 2.

The casing 10 of the threshing machine may be of any suitable or usual construction. The rear portion only of the threshing machine is shown in the drawings, but it will be understood that the threshing cylinder and other parts at the front end of the machine, which form no portion of the present invention, may be of any usual or suitable construction. The grain and straw from the threshing cylinder pass on to the straw rack and grain pan and are carried rearwardly by these parts through the machine. The straw rack may be of any suitable or usual construction, but as shown comprises a series of upwardly and rearwardly inclined sections 11 carried on side supports 12. The grain pan 14 is of course arranged below the straw rack and is secured to the side supports 13 and the sheet-iron bottom terminates short of the rear ends of the supports. At the rear end of the grain pan of the machine, and between the rear ends of the side supports 13 is mounted the main separating sieve 15. Rock-arms 16 are connected at their ends by pivots 17 to the longitudinal side supports 12 and 13 of the straw rack and grain pan. These rock-arms are fixed mid-way between their ends to the cross rock-shaft, 18 journaled in the machine casing. The forward ends of the straw rack and grain pan, which are not shown, are similarly connected in the well-known manner to a rock-shaft at the front part of the machine. Suitable means are provided for oscillating the rock-shafts and effecting a longitudinal reciprocation of the rack and grain pan to carry the straw and grain through the machine.

Below the main sieve is arranged a grain-shoe 19 that is carried upon spring supporting arms 20 and is reciprocated by a pitman 21 operated on a suitable shaft (not shown). The grain falling through the sieve 15 and sieve 23 of the shoe passes over the inclined bottom of the latter into the casing 24 of the grain auger 25. The cleaning-fan 26 is arranged within a casing 26′ in front of the shoe and delivers its blast upwardly and rearwardly through the shoe and sieve 15 to separate the chaff.

The parts thus far described form no portion of the present invention and may be of any usual or suitable construction.

The sieve frame comprises longitudinally extending side bars 27, connecting end-bars 28 and 29 and the intermediate longitudinal bars 30 extending between the end bars. These frame bars of the sieve are preferably formed of wood and the front end-bar 29 is connected to the side bars 27 by strengthening angle plates 31 of cast-iron that are bolted to the under sides of these bars. The rear end-bar 28 is similarly connected to the ends of the side bars 27 by strengthening angle plates or brackets 32 bolted to the underside of the bars. The brackets or plates 32 are somewhat larger and heavier than the plates 31 and are provided at their outer edges with depending lugs 33 for the purpose hereinafter set forth.

The plates of the sieve may be of any usual or suitable construction, but preferably consist as shown, of corrugated metal strips 34 fixed to the cross-rods 35. The corrugated strips 34 are of sufficient length to extend between the longitudinal side and intermediate bars 27 and 30 of the sieve frame and are held in inclined position, as shown in Fig. 6, so that the upper edge of each strip overlaps the lower edge of the adjacent strip. The cross rods 35 which carry the corrugated strips, preferably extend through all of the longitudinal frame bars of the sieve and are rotatably mounted so that the inclination of the corrugated strips may be adjusted as desired. For this purpose, the ends of the cross rods 35 are upturned to form cranks 36, (see Figs. 4 and 5) the ends of which engage a common connecting bar 37. A shifter-rod 38 is connected to the bar 37 and extends rearwardly through the upright portion of an angle bracket 39 mounted upon the rear end of the sieve frame. A hand wheel 40, threaded upon the end of the shifter-rod, may be turned to adjust the inclination of the corrugated sieve strips. Preferably, a spring 41 is coiled about the rod 38 and is interposed between the hand wheel 40 and bracket 39, so as to create friction enough to hold the hand wheel in the position in which it is set.

The adjustable extension at the rear end of the sieve comprises the short side bars 42 and the cross bars 43, which are preferably of wood and connected by strengthening angle plates 44 bolted to the under sides of the bars at their adjacent ends. Intermediate longitudinal bars 45 extend between the cross bars 43. The corrugated strips, supporting-rods therefor and adjusting devices for the strips are in all respects similar in construction and arrangement to those of the main sieve.

The main sieve is provided at its forward end with a strengthening cross strip 46 of wood that is set into the lower edges of the longitudinal bars 27 and 30 and secured thereto by screws 47.

In prior constructions the sieve has been removably secured in place upon cross rods extending between the rear ends or sieve carrying extensions of the side bars 13 of the grain conveyer. This construction is defective inasmuch as the cross rods tend to pull the supporting side bars together and jam or warp the plates of the sieve. Moreover, the sieve frame can be readily strengthened by providing longitudinal bars, but it cannot be provided with strengthening cross or transverse bars without interfering with the proper flow of the blast from the fan through the sieve. In accordance with the present improved arrangement, the thrust of the connections between the sieve and supporting side bars is longitudinal of the sieve frame instead of being transverse, as in prior devices.

The longitudinal side supports 13 of the grain pan are preferably formed of wood and wooden strips or bars 48, extending from the sheet-iron bottom or grain pan 14 to the ends of the side pieces, are securely fastened thereto by through bolts 49. These pieces 48, as shown in Fig. 5, are somewhat narrower than the bars but are bolted to the under sides thereof with the inner faces of the pieces 48 and side bars 13 in line. The sieves are arranged between these side pieces and a cross piece 50 abuts against the under sides of the longitudinal supporting bars 13 and against the forward ends of the pieces 48. This cross bar is rigidly connected to the side supports by bolts 51. On the rear face of the cross piece is disposed a cross channel-bar 52 that is securely held in place by bolts 53 extending therethrough and through the cross-bar 50. The flanges of the channel-bar project rearwardly and the front cross-bar 29 of the sieve is arranged to fit snugly between the flanges.

A pair of brackets 54 (see Figs. 2, 3 and 5) are shaped to snugly fit against the outer faces of the side bars 13 and pieces 48. These brackets are rigidly secured to the side bars by through-bolts 55 and are provided with inwardly projecting lugs 56 that are arranged longitudinally in line with the lugs 33 of the brackets 32 on the rear end of the sieve frame (see Fig. 2). Lugs 56 and 33 are perforated to receive the longitudinally extending bolts 57. When the sieve frame is in place the adjacent faces of the lugs 56 and 33 are separated to some extent, as shown in Fig. 2, and the lugs 33 on the sieve frame, are arranged in rear of the lugs 56 on the side supports so that by tightening the nuts 58 on the rear ends of the bolts 57, the sieve frame may be moved forwardly to force its front edge snugly into place between the flanges of the channel-bar 52. To remove the sieve, it is only necessary to take off the nuts 58 on the rear ends of the bolt 57 and the sieve may then be drawn forwardly out of engagement with the channel-bar 52. Notwithstanding the fact that the sieve may thus be readily and conveniently removed, it is rigidly held in position between the shifting side supports and the thrust of the connecting parts is exerted longitudinally on the frame, and, as the frame may be readily strengthened in this direction, there is no danger that the sieve plates will be jammed or bent.

The adjustable sieve extension which can be placed in different inclined positions to suit different circumstances, is not simply mounted upon pivot bolts as in prior constructions, but is directly connected at its forward edge to the rear edge of the main sieve by hinges 59 that are bolted to the upper faces of the adjacent cross-bars 28 and 43 of the sieve frames. A pair of brackets 60 are bolted to the rear ends of the side pieces 48 and are provided with downwardly projecting lugs 61. A pair of brackets 62 are centrally bolted to the side bars 42 of the extension sieve frame, and are provided with downwardly projecting lugs 63 having arc-shaped slots 64 concentric with the pivots of the hinges 59. Bolts 65 extend through the slot 64 of the bracket 63 and through the perforated lug 61 of the bracket 60 to securely clamp the extension sieve frame in adjusted position. By this arrangement the weight of the extension is carried by the supporting side bars and not by the connecting hinges 59. Bolts 65 are provided with nuts 66 on their outer ends and by loosening these bolts, the extension sieve may be readily adjusted to the desired position. Moreover, with this arrangement of the sieve extension, it is not necessary to remove the same as in some prior constructions, in order to get at the shoe sieve 23.

An inclined tailings pan 67 is secured to the rear inclined section 11 of the straw rack and delivers the tailings onto the sieve extension. From the latter the tailings fall into the casing 68 of the tailings auger 69 and are carried in the usual manner by a suitable conveyer or elevator back to the front end of the machine.

It is obvious that numerous changes may be made in the details of structure without departure from the essentials of the invention.

Having described my invention, what I claim as new and desire to secure by Letters Patent is:

1. In threshing machines, the combination with the sieve frame and the longitudinally reciprocating grain pan having extended side supports for the sieve frame, of a cross piece between said supports having rigid upper and lower flanges between which the forward end of said sieve frame fits, and separate clamping devices at opposite sides for rigidly and detachably securing the rear end of the sieve frame directly to said side supports, said sieve frame being movable end-wise, when said clamping devices are released, into and out of engagement with the flanges of said cross piece, substantially as described.

2. In a threshing machine, the combination with the sieve frame and with a longitudinally reciprocating grain pan having extending side supports for said sieve frame, of a cross piece between said supports having upper and lower flanges for receiving the forward end of the sieve frame and devices at the rear end of the sieve frame for detachably connecting the same to said side supports and for forcing the sieve frame end-wise into engagement with the flanges of said cross piece, substantially as described.

3. In a threshing machine, the combination with the sieve frame and with longitudinally reciprocating side supports therefor, of a cross piece between said supports having rigid upper and lower flanges between which one end of the sieve frame fits, and separate clamping devices arranged at opposite sides for rigidly but detachably connected the other end of the frame directly to said side supports, said clamping devices including means for forcing the frame end-wise into place between the flanges of said cross piece, substantially as described.

4. In threshing machines, the combination with the sieve-frame and with the reciprocating side supports therefor, of a cross-piece between said supports having flanges between which one end of the sieve-frame fits, companion lugs fixed to the opposite end of the sieve-frame and to said side supports, and bolts extending longitudinally through said lugs for forcing the sieve-frame endwise into place between the flanges of said cross-piece, substantially as described.

5. In threshing machines, the combination with the sieve-frame and grain pan having extended side supports for the sieve-frame, of a cross-piece having flanges for engaging the forward edge of said sieve-frame and means detachably connecting the rear end of said sieve-frame and said side supports, said connecting means being arranged to force the sieve-frame forwardly into place between the flanges of said cross-piece, substantially as described.

6. In threshing machines, the combination with the sieve-frame and with the side supports therefor, of a cross-piece having flanges for engaging the forward edge of said sieve-frame, lugs arranged in line fixed respectively to the rear ends of said sieve-frame and side supports, the lugs on the frame being in rear of and separated from those on the supports, and bolts longitudinally extending through said lugs, substantially as described.

7. In threshing machines, the combination with the sieve-frame and the grain pan having rearwardly extended side supports to form the sieve-frame, of a cross-channel bar between said side supports arranged to engage the forward edge of said sieve-frame, brackets having lugs arranged in line fixed respectively to the rear ends of said frame and side supports, the lugs on the frame brackets being in rear of and separated from those of the support brackets and bolts longitudinally extending through said lugs, substantially as described.

8. In threshing machines, the combination with the longitudinally reciprocating grain pan having extended side supports, of the sieve-frame comprising side and end bars and intermediate longitudinal bars, a cross-piece secured to said side supports having rearwardly projecting flanges arranged to engage the forward edge of said side supports, lugs on the rear ends of said frame and side supports and bolts extending longitudinally through said lugs to force the frame endwise to place between the flanges of said cross piece, substantially as described.

9. In threshing machines, the combination with the sieve-frame and with the longitudinally shifting grain pan having extended side supports, of pieces secured to the underside of said supports in rear of the pan bottom, a cross-bar between said side supports in front of the ends of said side pieces, a channel bar secured to the rear face of said cross-bar arranged to engage the forward end of said sieve-frame, brackets fixed to the rear ends of said frame and side supports and having depending offset lugs, the lugs of the frame brackets being in rear of and separated from those of the support-brackets and bolts extending longitudinally through said lugs, substantially as described.

10. In threshing machines, the combination with the main sieve and with the side supports extending beyond the rear edge of said sieve, of a sieve extension hinged to the rear edge of said main sieve, companion brackets fixed to said extension and to the rear ends of said side supports and clamp bolts extending through said brackets, whereby the weight of said extension is entirely carried by said side supports, one set of said brackets having bolt-receiving slots to permit the adjustment of said sieve extension, substantially as described.

11. In threshing machines, the combination with the main sieve and with the side supports therefor extending beyond the rear edge of said sieve, of a sieve extension hinged to the rear edge of said main sieve, a bracket fixed to each side of said extension intermediate its ends, a companion bracket fixed to the adjacent side support, clamp bolts extending through said brackets, whereby the weight of said extension is carried from said side supports, said bracket of each set having a bolt-receiving slot to permit the adjustment of said sieve extension, substantially as described.

12. In a threshing machine, the combination with the longitudinally reciprocating grain pan and the side supports therefor extending beyond its rear edge, of a main sieve, a cross piece extending between said side supports having upper and lower flanges for receiving the forward edge of the main sieve, means for detachably securing the rear edge of the main sieve to said side supports and for forcing the same longitudinally into position between the flanges of said cross piece, a sieve extension hinged directly to the rear edge of said main sieve and means on the rear ends of said side supports for adjustably supporting said sieve extension, substantially as described.

WALLACE F. MacGREGOR.

Witnesses:
JOHN PUGH, Jr.,
ELLIS J. GITTINS.